June 27, 1944. R. J. KUTZLER ET AL Re. 22,508

MOTOR CONTROL SYSTEM

Original Filed Nov. 20, 1939 2 Sheets-Sheet 1

Inventors
Robert J. Kutzler
LeRoy A. Griffith
By George H. Fisher
Attorney

June 27, 1944. R. J. KUTZLER ET AL Re. 22,508

MOTOR CONTROL SYSTEM

Original Filed Nov. 20, 1939 2 Sheets-Sheet 2

Inventors
Robert J. Kutzler
LeRoy A. Griffith
By George H. Fisher
Attorney

Reissued June 27, 1944

Re. 22,508

UNITED STATES PATENT OFFICE 22,508

MOTOR CONTROL SYSTEM

Robert J. Kutzler and Le Roy A. Griffith, Minneapolis, Minn., assignors to Minneapolis-Honeywell Regulator Company, Minneapolis, Minn., a corporation of Delaware Original No. 2,273,275, dated February 17, 1942, Serial No. 305,406, November 20, 1939. Application for reissue June 25, 1942, Serial No. 448,418

28 Claims. (Cl. 172—239)

The present invention relates to a motor control system and more particularly to one of the follow-up type.

A common form of motor control system of the follow-up type employs a control impedance and a fellow-up impedance, the follow-up impedance being adjusted by the motor, and the entire control system functioning to position the motor in accordance with the setting or value of the control impedance. The control impedance is often controlled automatically by some condition responsive device. While such a system is quite satisfactory and provides for a large number of positions of the control motor, the system becomes much less satisfactory in operation when it is necessary to compensate the system in accordance with other conditions. Thus in the temperature control art, it is often necessary to control the motor driving a temperature regulating device in accordance with several different conditions such as room temperature, relative humidity, and outdoor temperature. The usual practice in compensating a system of the type discussed is to introduce additional impedances. Certain of these impedances are introduced for reducing the controlling portion of the range of the main control impedance and others are introduced for providing the compensating action. The result of the introduction of these various impedances is that the sensitivity of the entire circuit is reduced and that the number of available positions is correspondingly diminished.

An object of the present invention is to provide a motor control system of the follow-up type in which the effect of a control impedance is varied, without appreciable change in the impedance of the control circuit, by the introduction of a variable voltage in the circuit.

A further object of the present invention is to provide such a system in which the amount of movement of the motor for a given adjustment of the control impedance is changed by the introduction of a variable voltage in the circuit.

A further object is to provide such a system in which the position of the motor for a given adjustment of the control impedance is changed by the introduction of a variable voltage in the circuit.

A further object of the invention is to provide such a system in which the control impedance is varied in accordance with the value of one condition and in which the variable voltage introduced in the circuit in varied in accordance with the value of a second condition.

A still further object of the invention is to provide such a system in which the control impedance is varied in accordance with the value of one condition and in the control circuit of which a variable control voltage is introduced, which voltage is varied in accordance with a plurality of compensating conditions.

A still further object of the invention is to provide such a control system for a plurality of motors in which a single control impedance controls the position of all the motors and in which the motors may be individually controlled through variable voltages associated with the individual motor control circuits.

Other objects of the present invention will be apparent from a consideration of the accompanying specification, claims and drawings of which:

Figure 1:
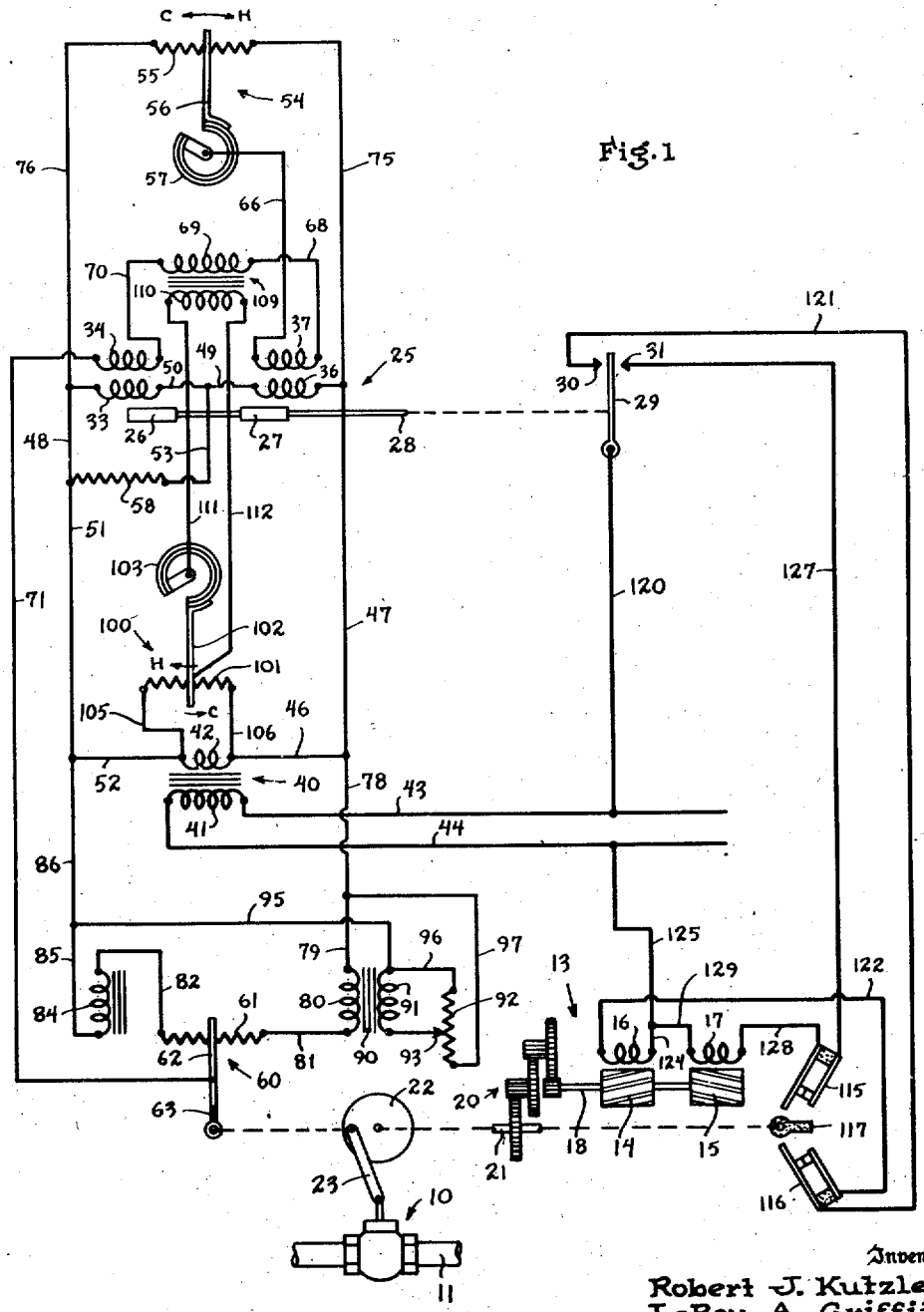
Figure 1 is a schematic view of one form of our improved motor control system used for temperature controlling purposes.

Referring to the drawings for a more detailed understanding of the invention, it will be noted that in Figure 1, the system is shown for purposes of illustration as controlling the position of a valve 10, which valve may be used for regulating the flow of a cooling medium through a pipe 11 leading to suitable cooling equipment not shown. The valve 10 is positioned by motor 13. This motor is of the reversible induction type comprising two rotors 14 and 15 with which are associated field windings 16 and 17, respectively. The two rotors are secured to a common shaft 18 which is connected through a reduction gear train 20 to a shaft 21. Secured to the shaft 21 is a crank-disc 22 which is connected by means of a link 23 to the stem of valve 10. It will be obvious that upon rotation of the shaft 21 in a clockwise direction, the valve stem is moved upwardly to open the valve and upon rotation of the shaft 21 in the opposite direction, the valve is moved toward closed position. Motor 13 rotates in one direction or another depending upon which of the two field windings 16 and 17 is energized.

The energization of windings 16 and 17 is controlled by a relay 25. This relay comprises a pair of magnetic cores 26 and 27 which are connected through a suitable connecting member 28 to a switch blade 29. Switch blade 29 is adapted to be moved into engagement with either contact 30 or contact 31. Associated with the core 26 are two windings 33 and 34. Associated with the core 27 are two windings 36 and 37. The position assumed by switch blade 29 is dependent upon the relative effective energization of windings 33 and 34 as compared with that of windings 36 and 37. When windings 33 and 34 are more highly energized than windings 36 and 37 the switch blade 29 is moved to the left, whereas when windings 36 and 37 are more highly energized the switch blade 29 is moved to the right.

A step-down transformer 40 is employed for supplying low voltage power to the relay and to the control system therefor. This transformer comprises a line voltage primary 41 and a low voltage secondary 42. Line voltage primary 41 is connected to line wires 43 and 44.

The two relay windings 33 and 36 are connected in series with each other across the low voltage secondary 42 as follows: from the right-hand terminal of secondary 42 through conductors 46, 47, relay coil 36, conductors 49 and 50, relay coil 33, and conductors 48, 51 and 52 to the other terminal of the secondary 42. Relay coils 33 and 36 are thus constantly energized, the energization being in phase with that of the voltage of secondary 42.

A resistor 58 is connected in parallel with relay coil 33 by conductors 50, 53 and 48. The purpose of resistor 58 is to reduce the energization of relay coil 33 with respect to relay coil 36 so that if the position of cores 26 and 27 is determined solely by the energization of the relay coils 33 and 36, the contact arm 29 is in engagement with contact 31 which, as will appear from the later description, results in the valve being driven to closed position.

The controlling impedance is generally designated by the reference numeral 54. This impedance may be controlled in any suitable manner but, for purposes of illustration, is shown in the form of a thermostatic potentiometer comprising a resistance element 55, a contact arm 56, and a bimetallic element 57 adapted to position the contact arm. The bimetallic element is so disposed that upon a temperature fall the contact arm 56 is moved to the left whereas on a temperature rise the contact arm is moved to the right. This is indicated on the drawings by the legends C and H, the legend C standing for cold and the legend H for hot. The bimetallic element 57 may be made responsive to the temperature of the space being cooled.

A follow-up impedance is designated by the reference numeral 60. This impedance also takes the form of a potentiometer comprising a resistance 61 and a contact arm 62. The contact arm 62 is secured to the motor shaft 21 through an insulated connection 63.

The relay coils 34 and 37 are connected in series between the contact arms 56 and 62 of the control and follow-up potentiometers as follows: from contact arm 56 through the bimetal 57, conductor 66, relay winding 37, conductor 68, transformer secondary winding 69, conductor 70, relay coil 34, and conductor 71 to contact arm 62. The resistance 55 of the control potentiometer 54 is connected across the low voltage secondary 42 as follows: from the right-hand terminal of secondary 42 through conductors 46, 47, 75, resistance 55, and conductors 76, 48, 51 and 52 to the other terminal of secondary 42. The resistance 61 of follow-up potentiometer 60 is also connected across the secondary 42 through the following circuit: from the right-hand terminal of secondary 42 through conductors 46, 78, and 79, secondary winding 80, conductor 81, resistance 61, conductor 82, secondary winding 84, and conductors 85, 86, and 52 to the other terminal of secondary 42. Disregarding the secondary windings 69, 80, and 84, it will be noted that the potentiometers 54 and 60 together with the power supply secondary 42 and the relay coils 34 and 37 constitute a bridge circuit wherein the relay coils 34 and 37 are energized by the unbalance current of the bridge. In other words, disregarding the effect of the transformer secondaries 69, 80 and 84, when the two contact arms 62 and 56 are similarly positioned there is no potential between them and hence no current flow through relay coils 34 and 37. Upon the position of one of these contact arms being changed with respect to the other, however, a voltage is impressed across the two contact arms, which voltage is either in phase with the voltage of secondary 42 or 180° displaced therefrom depending upon the relative positions of contact arms 56 and 62. Thus if contact arm 56 is to the right of the position occupied by contact arm 62, the voltage between contact arms 62 and 56 is in phase with the voltage of secondary 42 whereas when contact arm 56 is to the left of the position occupied by contact arm 62, the voltage between contact arm 62 and contact arm 56 is 180° displaced in phase from the voltage across secondary 42.

It will be noted that the coils 34 and 37 are oppositely connected into the circuit between the contact arms 56 and 62. Thus any increase in the current flow through these two coils results in the flux generated by one of the coils aiding its adjacent relay coil and by the other opposing its adjacent relay coil. In other words, if the case is considered in which contact arm 56 is to the right of the position occupied by the contact arm 62, disregarding the effect of the other secondary windings 69, 80 and 84, the current flow through relay coil 34 will be in phase with that through relay coil 33 while the current flow through relay coil 37 will be opposed in phase to that through relay coil 36. Consequently, coils 33 and 34 will cooperate while coils 36 and 37 will oppose each other. Under these circumstances, the collective effect of relay coils 33 and 34 will be greater than relay coils 36 and 37 and the switch blade 29 will be moved into engagement with contact 30. Similarly, if contact arm 56 occupies a position to the left of that occupied by contact arm 62, the current flow through relay coil 37 will be in phase with that through relay coil 36 while the current flow through relay coil 34 will be 180° displaced in position with respect to the current flow through relay coil 33. Under these circumstances, the relay coils 36 and 37 will cooperate and will produce a resultant effect greater than relay coils 33 and 34 which oppose each other.

The system so far described does not form part of our invention except in so far as our invention is particularly desirable with and constitutes an improvement of this type of system. In tracing the connections between resistance 61 and the secondary 42, it will be noted that these connections include two secondaries 80 and 84. These two secondaries are two secondaries of a transformer the core of which is indicated by the reference numeral 90 and the primary of which is indicated by the reference numeral 91. One terminal of the primary 91 is connected by conductor 96 to a resistance 92 of a potentiometer having a sliding contact 93. The sliding contact 93 is connected to the other terminal of primary 91. The resistance 92 is connected to the secondary 42 by conductors 52, 86, 95, 96, 97, 78, and 46. In other words, the resistance 92 is connected across the secondary 42 and a variable portion of the voltage of secondary 42 is applied to the transformer 91 depending upon the position of tap 93 which slides over resistance 92. By varying the voltage of primary 91, the voltage of secondaries 80 and 84 is similarly varied. The two secondaries 80 and 84 are connected in series so that the voltage drops across the two are in the same direction. In other words, let it be assumed that the secondary voltage of transformer 40 is 20 volts so that 20 volts is normally impressed across the relay coils 33 and 36, across the potentiometer resistance 55, and across the potentiometer resistance 61. Any variation in the position of contact arm 62 has the same effect as a similar movement of contact arm 56 in the opposite direction. Let it be assumed now that the contact 93 is adjusted, however, so that 5 volts are produced in each of the secondaries 80 and 84. Under these conditions, the 20 volts drop between the two terminals of the transformer 42 over the path including resistance 61 will include 10 volts that is due to the secondaries 80 and 84. The result is that there is only a 10 volt drop across resistance 61 so that a given movement of contact arm 62 has a less effect than a given movement of contact arm 56. Because of this it is necessary for contact arm 62 to move a substantial distance to rebalance a slight movement of contact arm 56 and accordingly movement of contact arm 56 over only a portion of this range of movement effects a full movement of the motor 10 corresponding to a movement of contact arm 62 over its entire range. It will thus be noted that by the introduction of the transformer secondaries 80 and 84 the relative effects of potentiometers 54 and 60 are varied. The purpose of this will be apparent from the subsequent description.

The purpose of introducing secondary windings 80 and 84 to reduce the movement of contact arm 56 necessary to effect the full movement of the valve is that it is desired to compensate the action of contact arm 56, or in other words, to shift the temperature range over which contact arm 56 is effective to control the valve. Thus assume that the contact arm 56 assumes the position shown when the bimetallic element 57 is subjected to a temperature of approximately 70°. Let it also be assumed that the total range of movement from one end of the resistor to the other takes place over a range of 10°. Let it further be assumed that the position shown is a position a quarter of the distance from the right-hand, then only 2½° temperature rise is permitted before the contact arm 56 would leave the end of the resistor and cease to have any controlling effect. If it is desired to maintain 70°, the contact arm 56 in moving over a 5° range (2½° on either side of the position shown) must actuate the valve between its full closed and full open positions. In other words, if it is desired to shift the control range of the potentiometer 54, it is necessary at any one time to use only a small portion of the control potentiometer and in order to maintain the temperature within this narrow range it is necessary to render the motor capable of operating the valve through its entire range while the control potentiometer is moving over this narrow portion of its range.

The compensating means may take any suitable form, being shown here as a thermostatically controlled compensating potentiometer 100. This potentiometer comprises a center tapped resistance 101 and a contact arm 102, which contact arm is positioned by bimetallic element 103. Bimetallic element may, if desired, be responsive to outdoor temperature. The resistance 101 is connected by conductors 105 and 106 to the opposite terminals of transformer secondary 42. The potentiometer 100 controls the energization of a transformer 109 comprising secondary 69, previously mentioned, and primary winding 110. One terminal of primary winding 110 is connected by conductor 111 and bimetallic element 103 to the contact arm 102. The other terminal is connected by conductor 112 to the center tap of resistance 101. The compensating potentiometer 100 thus serves to apply a variable portion of the voltage of secondary 42 to the primary 110 and thus to induce a voltage in secondary 69 which is variable in phase and magnitude in accordance with the temperature to which bimetallic 103 is subjected. Let it be assumed that the bimetallic element moves the contact arm 102 to the right upon a temperature fall as indicated by the legend adjacent the contact arm. Then as the temperature drops, a voltage will be impressed on winding 69, which voltage will have a phase relation such that it produces the same unbalancing effect as is caused by a movement of contact arm 56 to the right with respect to contact arm 62. Under these circumstances, a new condition of balance will find contact arm 56 to the left of its previously occupied position. In this manner, the entire control range is shifted to the left on resistance 55. If, on the other hand, the temperature adjacent bimetallic element 103 drops so as to cause a movement of contact arm 102 to the left, the voltage impressed on winding 69 will have a phase relation such that it produces the same unbalancing effect as is caused by a movement of contact arm 56 to the left with respect to contact arm 62. This will cause a shift of the entire control range to the right on resistance 55.

The three potentiometers 54, 60, and 100 thus jointly control the energization of the relay which in turn controls the energization of the motor 13. The energization of motor 13 is further controlled by limit switches 115 and 116. Each of these limit switches comprise a pair of switch blades one of which is relatively long to engage with an arm 117 of insulating material carried by the shaft 21. The arm 117 is adapted to engage the long blade of the respective limit switch and to thus open that limit switch when the movement of shaft 21 approaches the end of the desired range of movement of the control device.

*Operation*

Let it be assumed that the various elements are shown in the position occupied in which there is substantially no voltage being applied to the primary winding 110 and transformer 109 so that substantially no compensating effect is being introduced into the control circuit for the relay. The relay is maintained in a balance position due to the fact that the resistor 58 which shunts the coil 33 introduces an unbalancing action, which unbalancing action is compensated for by the fact that the contact arm 56 is very slightly to the right of the position occupied by contact arm 62. Thus consider the situation at the half cycle during which the left-hand terminal of secondary 42 is positive with respect to the right-hand terminal. The current flow under these circumstances is from left to right through relay coils 33 and 36. Due to the slightly unbalanced condition of contact arms 62 and 56, the current flow through relay coils 34 and 37 is from contact arm 62 through relay coils 34 and 37 to the contact arm 56. This results in the current flow through relay coil 34 being the same as through relay coil 33 and that through relay coil 37 being opposite to that through relay coil 36. The result of this ceurrent flow through relay coils 34 and 37 is to increase the effect of relay coil 33 and decrease that of relay coil 36. This counterbalances the opposite effect of shunting resistance 58 so that the relay 25 is maintained in its neutral position.

Now let it be assumed that there is a rise in temperature to which controlling potentiometer 54 is responsive. This temperature may, for example, be the room temperature. The result of this is that the current flow from contact arm 62 to and through contact arm 56 is increased so as to increase the energization of relay coils 34 and 37 and to hence cause the combined effect of relay coils 33 and 34 to be greater than that of relay coils 36 and 37. This will result in movement of switch blade 29 to the left into engagement with contact 30. A circuit is now established to motor field winding 16 as follows: from line wire 43 through conductor 120, switch blade 29, contact 30, conductor 121, limit switch 116, conductor 122, motor winding 16, and conductors 124 and 125 to the other line wire 44. The result of the energization of field winding 16 is to cause the motor 13 to rotate in a direction such as to cause clockwise rotation of shaft 21.

This clockwise movement of shaft 21 rotates crank-disc 22 in a clockwise direction to move the valve 10 towards open position and cause more cooling action. The same clockwise movement of shaft 21 also causes the movement of contact arm 62 to the right. This movement continues until the position of contact arm 62 corresponds to the new position of contact arm 56 considering the effect of resistance 58. When this position is reached, the relay will again be rebalanced and switch blade 29 will separate from contact 30. If the system did not become rebalanced before valve 10 reached its full open position, the arm 117 would engage the long blade of limit switch 116 and open the motor circuit just traced.

If, on the other hand, the temperature to which bimetallic element 57 is subjected falls, then the current flow through relay coils 34 and 37 will be decreased or even shifted 180° in phase, depending upon the amount of deflection of contact arm 56. In either event, the effect will be to decrease the combined effect of relay coils 33 and 34 and to increase the combined effect of relay coils 36 and 37. The result is that switch blade 29 will now move into engagement with contact 31 so as to cause the establishment of the following motor circuit to field winding 17: from line wire 43 through conductor 120, switch blade 29, contact 31, conductor 127, limit switch 115, conductor 128, field winding 17, and conductors 129 and 125 to the other line wire 44. The energization of this field winding will cause the motor to rotate in the opposite direction to cause counter-clockwise rotation of shaft 21. This counter-clockwise rotation of shaft 21, with the accompanying counter-clockwise rotation of crank-disc 22, causes valve 10 to be moved toward closed position to reduce the flow of cooling fluid. The counter-clockwise rotation of shaft 21 also causes movement to the right of contact arm 62. This movement takes place until contact arm 62 has reached a position corresponding to the new position of contact arm 56 considering the effect of resistance 58. When the contact arm 62 reaches this position, the relay will again be rebalanced and the energization of the motor will be terminated. If the system should not become rebalanced by the time the valve reaches closed position, limit switch 115 will be opened to terminate the energization of the motor.

The operation which has just been described is that which takes place when the compensating potentiometer 100 is having no effect whatsoever upon the system, that is, when the outside temperature to which bimetal 103 responds is at an intermediate value such as 85° so that the contact arm 102 is engaging the center tap of resistance 101. Let it be assumed that the outside temperature drops so that the contact arm 102 is moved to the right to apply a voltage to primary 110 and hence to secondary 69. As previously indicated, this has the same effect as a movement of contact arm 56 to the right. In other words, the combined effect of relay coils 33 and 34 is increased with respect to relay coils 36 and 37 so as to cause switch blade 29 to move into engagement with contact 30. As previously pointed out, this causes a clockwise rotation of shaft 21, which in turn results in an opening of the valve and a movement of contact arm 62 to the right. This in turn causes an increase in the delivery of cooling medium which eventually causes a reduction in room temperature and a movement of contact arm 56 to the left. This in turn unbalances the relay in the other direction so as to cause the motor to drive back more nearly to its normal position and the movement of contact arm 62 to more nearly the mid position shown. When the system finally becomes rebalanced, contact arm 56 will be to the left of the position shown. In other words, the control range will have been shifted downwardly so that a slightly lower range of temperature is maintained. If the outdoor temperature rises, however, so as to cause a movement of contact arm 102 to the left, the voltage introduced by secondary 69 will be displaced 180° in phase from the voltage introduced by secondary 69 upon a drop in outdoor temperature. The result is that the effect will be opposite to that just described so that the control range will be shifted upwardly. In the type of temperature control system with which our improved motor control system is shown for illustrative purposes in Figure 1, this is quite desirable. In order to avoid shock to the person entering a cooled building, it is quite customary to shift the temperature which is maintained in accordance with outside temperature. The purpose of this is to reduce the difference in temperature between the interior of the building and the outside. The control system of Figure 1 thus provides for increasing or decreasing the inside temperature as the outside temperature increases or decreases. It is to be understood, however, that the present invention does not rely upon the specific temperature control system but resides in the improved motor control system which may be used wherever it is desired to control a motor in accordance with several conditions.

It will be seen that with the arrangement described, the compensation of the system is done entirely by the introduction of voltages and not by the introduction of impedances. The im-

BEST AVAILABLE COPY pedance of transformer 69 is relatively slight and substantially constant. It is only the voltage which is changed appreciably and the introduction of this voltage introduces no appreciable losses. The principal losses which occur because of compensation are the losses taking place in potentiometer resistances 101 and 92. These losses, however, are exterior to the control circuit proper. By reason of this, a very much larger number of positions of the control device can be obtained since the power available for operation of the relay remains substantially the same and small changes therein will result in actuation of the relay between its two contact positions.

If for any reason, either contact arm 56 or 62 fails to engage its respective resistance, the valve will move to a safe position by reason of the effect of resistance 58. As previously pointed out, if the position of the relay is determined solely by the energization of relay coils 33 and 36, the relay will be moved to its right-hand position by reason of the shunting effect of resistance 58 with respect to winding 33. When the relay is in this position, switch blade 29 is in engagement with contact 31 so that field winding 17 is energized and the motor is rotated so as to close the valve. If it is contact 62 which does not effectively engage resistance 61 then as soon as the motor starts moving, the contact arm 62 will be moved and will through the wiping action probably establish connection with resistor 61. This is due to the fact that the usual cause for failure of the contact arm to engage with the resistor is due to a defective spot in the resistor. As soon as the contact arm starts moving, it will leave this defective spot. Upon reengagement of the contact arm with the resistor, the relay energization will again be controlled also by coils 34 and 37 and the relay will be energized in the opposite direction to effect reverse movement. The system will continue to hunt until the resistance or contact arm is cleaned by the resultant wiping action or until the temperature changes will cause the contact arm to normally assume a new location. If it is contact arm 56 which does not engage its associated resistor then it is impossible immediately to rebalance the energization of the relay 25 and the motor continues to run until the arm 117 engages the limit switch 115, at which point the valve is substantially closed and further valve movement is terminated unless the movement of contact arm 56 caused by the resulting change in temperature causes the arm to reengage its resistor. It will be readily seen that in any event a dangerous condition cannot be created in this manner such as might occur if the valve were allowed to remain in any position in which it happened to be at the time of failure of the contact arm.

Figure 2:
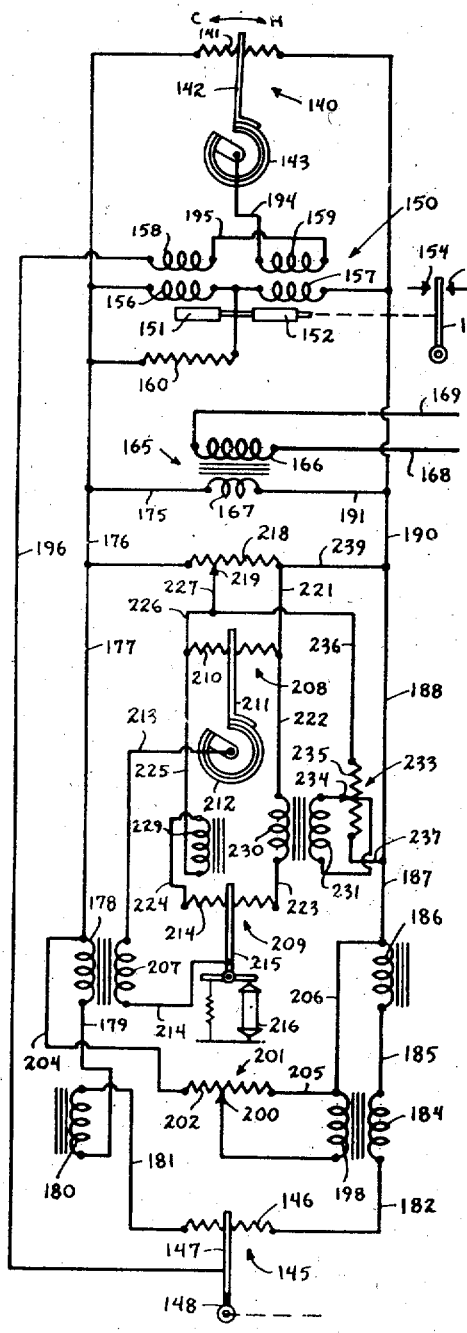
Figure 2 is a schematic view of a modified form of our motor controlling circuit.

*Species of Figure 2*

In the species of Figure 1 which has been described, only one compensating potentiometer is employed. In the species of Figure 2, provision is made for two compensating potentiometers. It is often necessary to control in accordance with one condition and to compensate in accordance with several other conditions. One such instance is that in which it is desired to control in accordance with both outside temperature and inside relative humidity. The arrangement of Figure 2 further contemplates a somewhat different method of introducing the compensating voltage. In general, it may be stated that the compensating voltage in Figure 1 is introduced in the connection between the control and rebalancing potentiometer arms whereas in the present instance the compensating voltage is introduced into the connections between the resistances of the control and rebalancing potentiometers. In other words, in the Figure 1 species, the compensating voltage is introduced into the "center leg" of the control system whereas in the species of Figure 2 the compensating voltages are introduced into the "side legs." In view of the fact that the operation of the relay upon the motor and the effect of the motor are the same as in Figure 1, the motor, the limit switches, the valve, and the connection of the motor to the rebalancing potentiometer arm have been omitted in the Figure 2 species.

In this figure, the control potentiometer is designated by the reference numeral 140. This control potentiometer 140 comprises a resistance 141 over which moves a contact arm 142, which contact arm is actuated by a bimetallic element 143. The rebalancing potentiometer, designated by the reference numeral 145, comprises a resistance 146 over which moves a contact arm 147. It will be understood that contact arm 147 is connected through an insulated connection 148 to a shaft corresponding to the shaft 21 of the Figure 1 species so that any movement of the motor causes a corresponding movement of contact arm 147.

A relay corresponding to relay 25 of the Figure 1 species is designated by the reference numeral 150. This relay comprises a pair of armatures 151 and 152 which are connected to a switch blade 153. Switch blade 153 is adapted to engage either of two contacts 154 and 155. Cooperating with the armatures 151 and 152 are two coils 156 and 157. As will be pointed out later, these coils are constantly energized. Associated with relay coils 156 and 157, respectively, are relay coils 158 and 159. It will be understood that coils 156 and 158 correspond to coils 33 and 34 and coils 157 and 159 correspond to coils 36 and 37 of the Figure 1 species. A resistance 160 is connected across relay coil 156 to decrease the energization of this relay coil with respect to relay coil 157.

Power is supplied to the system by a step-down transformer 165. This transformer comprises a line voltage primary 166 and a low voltage secondary 167. The line voltage primary 166 is connected to line wires 168 and 169.

As in the Figure 1 species, the control potentiometer, the relay coils 156 and 157, and the follow-up potentiometer are connected across the low voltage secondary 167 in parallel with each other. The connections of the control potentiometer 140 and the relay coils 156 and 157 to the secondary 167 are substantially the same as in the preferred species and need not be specifically traced. The resistance 146 of follow-up potentiometer 145 is connected to secondary 167 as follows: from the left-hand terminal of secondary 167 through conductors 175, 176, 177, secondary winding 178, conductor 179, secondary winding 180, conductor 181, resistance 146, conductor 182, secondary winding 184, conductor 185, secondary winding 186, and conductors 187, 188, 190 and 191 to the other terminal of secondary winding 167. Relay coils 158 and 159 are connected directly between contact arm 142 of control potentiometer 140 and contact arm 147 of the follow-up potentiometer 145 as follows: from contact arm 142 through bimetallic element 143, conductor 194, relay coil 159, conductor 195, relay coil 158, and conductor 196 to contact arm

BEST AVAILABLE COPY

147. It will be noted that the connection of relay coils 158 and 159 between the two contact arms corresponds to the connection of relay coils 34 and 37 in the species of Figure 1 with the exception that the coils are directly connected between the two contact arms and are not associated with the secondary of a transformer. On the other hand, the connection of resistance 146 to the power supply now includes two sets of transformer secondaries instead of one set. The manner in which these transformer secondaries are associated with the control circuit will now be described.

The secondary windings 180 and 184 constitute the secondary windings of a transformer whose primary winding is designated by the reference numeral 198. These secondary windings correspond to windings 80 and 84 of the previously described species. In other words, these secondaries introduce a voltage which reduces the sensitivity of potentiometer 145 with respect to potentiometer 140. The primary winding 198 is connected at one end to a sliding tap 200 of a potentiometer 201. Tap 200 slides over a resistance 202, which resistance is connected by means of conductors 175, 176, 177, 204, 205, 206, 187, 188, 190 and 191 to the secondary 167. The resistance 201 thus has the full voltage of secondary 167 impressed across it and the primary winding 198 has applied thereto a variable portion of this voltage depending upon the position of the tap 200. As explained in connection with the secondary windings 80 and 84 of the Figure 1 species, the transformer secondaries 180 and 184 introduce voltages in the same direction which result in reducing the voltage drop across resistance 146. This means that a greater movement of contact arm 147 must occur for a given movement of contact arm 142. By adjusting the position of tap 200, accordingly, the sensitivity of control potentiometer 142 is varied.

The secondary windings 178 and 186 produce the same effect as the secondary winding 69 of the Figure 1 species. These two secondary windings are associated with primary winding 207. The energization of the primary winding 207 is controlled by a pair of compensating potentiometers 208 and 209. The compensating potentiometer 208 comprises a resistance element 210, a contact arm 211, and a bimetallic element 212 which may be responsive to outdoor temperature. The compensating potentiometer 209 comprises a resistance element 214 over which moves a contact arm 215 actuated by a relative humidity responsive element 216. Connected across low voltage secondary 167 is a resistance element 218. This resistance element has a sliding contact 219 engaging the same to form a potentiometer. The resistance elements 210 and 214 of potentiometers 208 and 209 are connected in parallel with each other across the portion of resistance 218 between the right-hand end thereof and the sliding contact 219 by conductors 221, 222, 223, 224, 225, 226, and 227. The voltage applied to resistances 210 and 214 is the determined by the position of sliding contact 219 which may be manually adjusted. The primary winding 207 is connected between contact arms 211 and 215 as follows: from contact arm 211 through bimetallic element 212, conductor 213, primary winding 207, and conductor 214 to contact arm 215. It will be noted from the above connections that the two potentiometers 208 and 209 are connected to form a bridge circuit with the primary winding 207 responsive to the unbalanced voltage thereof. Thus the voltage is applied to primary winding 207 whenever the relative values of the conditions to which condition responsive elements 212 and 216 are responsive is changed.

Any voltage which is impressed upon primary winding 207 results in a voltage being impressed upon secondary windings 178 and 186. Tracing the connections from supply secondary winding 167 through resistance coil 146 and back, it will be noted that secondary windings 178 and 186 are connected in opposition so that these windings do not affect the voltage drop across resistance 146. The two secondary windings do, however, have the effect of shifting the mid point of the voltage drop between the two ends of the rebalancing portion of the control circuit. To illustrate this, let the operation be considered during the half cycle in which the left-hand end of secondary 167 is positive with respect to the right-hand end thereof. Let it be assumed that there is a 20 volt drop across secondary 167 and that potentiometer 201 is so adjusted that there are five volt drops across each of the secondary windings 180 and 184. Since the secondary windings 180 and 184 aid each other, the total drop across these two secondary windings will be 10 volts so that there will be only 10 volts drop across the resistance 146. Thus proceeding from the left-hand terminal of secondary 167, there will be a 5 volt drop across winding 180, 10 volts across winding 146, and 5 volts across winding 184. The mid point of the voltage drop will still, however, be the mid point of resistor 146. Now let it be assumed that the relative positions of contact arms 211 and 215 are so changed that 2 volts are impressed upon each of windings 178 and 186, this voltage being of such phase that the upper end of the secondary winding 178 is the positive end during the half cycle being considered. If we now trace from the left-hand end of secondary winding 167 around the circuit including resistance winding 146, there would still be only 20 volts drop and there would still be only 10 volts across resistance 146 due to the fact that the two volts introduced by the winding 178 is cancelled out by the opposing and equal voltage introduced by winding 186. The mid position is, however, changed since there will now be 2 volts across secondary 178 and 5 volts across winding 180 leaving the mid point of the voltage drop around the follow-up portion of the system at a point three tenths of the distance from the left-hand end of resistance 146.

It will be seen from the above that the circuit including compensating potentiometers 208 and 209 introduces a voltage into the control circuit which has as its effect the shifting of the relation of the control potentiometer 140 and the follow-up potentiometer 145. Such a shifting of the relation between these two potentiometers results in a new valve position for any given position of the control potentiometer arm. The resultant effect will be to shift the control point of potentiometer 140. The effect of the control potentiometers 208 and 209 can be adjusted by the adjustment of sliding contact 219 with respect to resistance 218. The potentiometer comprising resistance 218 and the sliding contact 219 thus becomes a means for adjusting the percentage of compensation.

In tracing the connections between potentiometers 208 and 209, secondary windings 220 and 230 between conductors 224 and 225 and between conductors 222 and 223 were not mentioned in order to simplify the description. These secondary windings 229 and 230 constitute the secondary windings of a transformer whose primary winding is indicated by the reference numeral 231. The primary winding 231 is connected at one end to the sliding tap 234 of a potentiometer 233 comprising this sliding tap 234 and a center tapped resistance 235. The other end of primary winding 231 is connected to the center tap of resistance 235. The resistance 235 is connected by conductors 236 and 227 and conductors 237, 188, and 239 across the same portion of resistance 218 as resistance elements 210 and 214 are connected. In other words, the resistance element 235 has applied thereto the same voltage as resistances 210 and 214 of potentiometers 208 and 209. A variable portion of this voltage is applied to primary winding 231 and hence to secondary windings 230 and 229.

The secondary windings 229 and 230 are connected so that the voltages introduced by them aid each other. The result is that they have the same effect with respect to the relative effects of potentiometers 208 and 209 as secondaries 180 and 184 have with respect to the relative effects of potentiometers 140 and 145. In other words, if the voltages introduced by the secondaries 229 and 230 are in phase with the potential difference across resistance 214, the portion of the total potential difference between conductors 225 and 222 that exist across resistor 214 is decreased since part of the potential difference between conductors 225 and 222 occurs in the secondaries 229 and 230. If on the other hand, the voltages introduced by secondaries 229 and 230 oppose the normal potential drop through resistor 214, the potential drop occurring across resistor 214 will be increased. Thus the relative effects of potentiometers 208 and 209 upon the energization of transformer primary 207 are varied by movement of the slider 234. When the slider 234 is moved upwardly with respect to resistance 235, the voltages introduced by secondaries 229 and 230 are in phase with the voltage between conductors 225 and 222 and the effect of potentiometer 209 is reduced with respect to that of potentiometer 208. If on the other hand the slider 234 is moved downwardly, the opposite effect is produced so that potentiometer 209 has a greater effect than potentiometer 208.

*Operation of Figure 2 species*

As in the species of Figure 1, the various elements are shown in the positions assumed when substantially no compensating effect is being introduced. The position of contact arm 142 is the slightly unbalanced position necessary to overcome the effect of resistance 160. In other words, the current introduced in the relay coils 158 and 159 as a result of the slight difference in the relative positions of contact arms 142 and 147 just overcomes the unbalance in the energization of relay coils 156 and 157 due to the presence of the parallel resistance 160. Under these circumstances, the relay is balanced and switch blade 153 is in engagement with neither contact 154 or 155. The resistance 160 is of higher value than in the species of Figure 1 so that contact arm 142 need be only a slight distance from mid-position to overcome the unbalancing effect of resistance 160.

Since the two conditions to which control potentiometers 208 and 209 respond are assuming corresponding values, the voltage introduced by secondaries 178 and 186 is negligible. If either the outside temperature or the humidity changes, however, a voltage is applied to winding 207, which voltage varies in magnitude in accordance with the direction of unbalance. Thus if the contact arm 211 is moved to the right with respect to the position occupied by contact arm 215 as a result of a rise in outside temperature, a voltage will be applied to primary 207 which will in turn introduce a voltage in secondaries 178 and 186. Under these circumstances, the voltage of secondary 178 will oppose that of secondary 167 while the voltage of winding 186 will aid that of secondary 167. This will result in the system being balanced when contact arm 147 is in a position to the left of that shown. It may be recalled that from the disclosure of Figure 1, movement of contact arm 147 to the left accomplishes a closure of the valve controlling the supply of cooling fluid. Thus the effect of the compensation introduced into the system is that of causing a decrease in the supply of cooling fluid for the same position of the control arm 142. This will result in an increase in the space temperature so as to cause the system to eventually be rebalanced with the contact arm 142 in a new position to the right of that shown. In other words, the increase in outside temperature has resulted in an increase in the room temperature. It will be obvious that if the outside temperature decreases, the opposite effect will result so that the position of contact arm 147 will be shifted to the right with respect to contact arm 142. At any time that it is desired to vary the total amount of compensation, the slider 219 can be adjusted so as to vary the voltage applied to the control potentiometers 208 and 209 and thus to vary the unbalance voltage.

The relative effect of the two compensating potentiometers 208 and 209 can be varied as previously explained by adjustment of slider 234 with respect to slider 235. This adjustment changes the amount and phase of the voltage impressed upon secondary windings 229 and 230 and hence changes the voltage drop across resistance 214 with respect to the voltage drop across resistance 210.

It will be seen that with the system of Figure 2, a motor control system is provided whereby the motor is positioned in accordance with one main control potentiometer and two compensating potentiometers. The relative effects of the two compensating potentiometers can be readily varied and the combined effect of the compensating potentiometers with respect to the main control potentiometer can also be varied. In every case the losses due to the various adjusting impedances are external to the control circuit so that the total impedance of the control circuit remains substantially the same.

Figure 3:
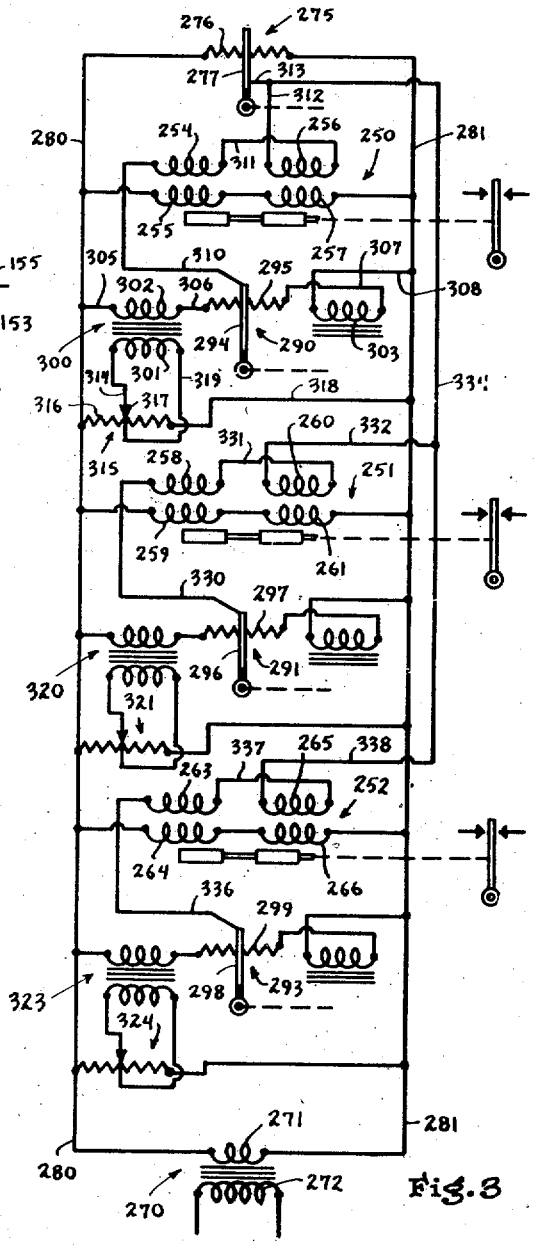
Figure 3 is a schematic view of a still different form of our improved system.

*Species of Figure 3*

In Figure 3 we have shown a form of our invention wherein a plurality of motors may be simultaneously or individually controlled. For purposes of simplicity, the individual motors and the connections therewith with their respective follow-up potentiometers have not been shown. It is to be understood that in this respect, each unit of the system is identical to that of Figure 1.

An individual relay controls each of the motors. These relays are designated by the reference numerals 250, 251, and 252. Each relay, as in the case of relay 25 of the preferred species, comprises a switch blade cooperating with contacts to energize a reversible motor in one direction or the other. In each relay, the switch blade is positioned by a pair of armatures which cooperate with two sets of relay coils. The position of the armatures and consequently of the switch blade is dependent upon the relative effects of the two sets of relay coils. Inasmuch as the relay coils are the only elements of the relay which are directly connected into the control circuit, only these elements will be specifically referred to by reference characters. The relay 250 comprises relay coils 254 and 255 on the left-hand side and relay coils 256 and 257 on the right-hand side. Relay 251 comprises relay coils 258 and 259 on the left-hand side and coils 260 and 261 on the right-hand side. Similarly, relay coil 252 is provided with relay coils 263 and 264 on the left-hand side and relay coils 265 and 266 on the right-hand side.

A step-down transformer 270 supplies power for the control system. This transformer comprises a low voltage secondary 271 and a line voltage primary 272.

The main control potentiometer is designated by the reference numeral 275. This control potentiometer comprises a resistance 276 and a contact arm 277. The contact arm 277 is shown as one which is manually positioned although it is to be understood that the same could be automatically positioned if desired.

The two ends of resistance 276 are connected to the opposite terminals of secondary 271. For convenience of description, the resistance 276 and secondary 271 may be regarded as connected by two continuous conductors designated by the reference numerals 280 and 281. In other words, conductors 280 and 281 are continuous with the various side conductors hereinafter described as connected thereto rather than as separating the conductors 280 and 281 into sections. Connected between conductors 280 and 281 in parallel are relay coils 255 and 257 of relay 250, the relay coils 259 and 261 of relay coil 251 and the relay coils 264 and 266 of relay coil 252. In other words, the coils thus named are each connected across the source of power so as to be energized in phase with the voltage of secondary 271.

Associated with each of the motors controlled and with each of the relays 250, 251 and 252 is a rebalancing potentiometer. These rebalancing potentiometers are designated by the reference numerals 290, 291 and 293. The potentiometer 290 comprises a contact arm 294 and a resistance 295, the potentiometer 291 a contact arm 296 and a resistance 297, and the potentiometer 293, a contact arm 298, and a resistance 299.

Associated with each of the follow-up potentiometers 290, 291 and 293 is a transformer for introducing a control voltage. The transformer associated with follow-up potentiometer 290 is designated by the reference numeral 300 and comprises a primary winding 301 and a pair of secondary windings 302 and 303. The secondary windings are connected in series with the resistance 294 and in opposition to each other between the conductors 280 and 281 connected to the secondary 271. These connections are as follows: from conductor 280 through conductor 305, secondary winding 302, conductor 306, resistance 294, conductor 307, secondary winding 303, and conductor 308 to conductor 281. The two secondary windings 302 and 303 play the same function as the secondary windings 178 and 186 in the control system of Figure 2. In other words, these two secondary windings due to the fact that they oppose each other do not change the total voltage drop across resistance 294. Their only effect is to shift the mid-point of the voltage drop between conductors 280 and 281 through resistance 294. The relay coils 254 and 256 are connected between contacts 294 and 277 as follows: from contact arm 294 through conductor 310, relay coil 254, conductor 311, relay coil 256, and conductors 312 and 313 to contact arm 277. Thus the shifting of the mid-point of the voltage drop across conductors 280 and 281 through resistance 294 causes a shifting in the energization of the windings 254 and 256 to unbalance the relay and cause a movement of the motor together with the movement of contact arm 294.

The amount of voltage introduced by secondaries 302 and 303 is controlled by adjusting the voltage applied to primary 301 through a potentiometer 315. Potentiometer 315 comprises a center tapped resistance element 316 and a sliding contact 317. One end of the resistance element 316 is connected directly to conductor 280 and the other is connected by conductor 318 to conductor 281. The resistance 316 is thus connected across the secondary 271 and the voltage applied to primary 301 is the variable portion of the secondary voltage 271 determined by the position of contact 317.

Associated with the potentiometer 291 is a transformer 320, the energization of which is controlled by a potentiometer 321. Similarly associated with the follow-up potentiometer 293 is a transformer 323, the energization of which is controlled by a potentiometer 324. It is to be understood that transformers 320 and 323 correspond in function to transformer 300 and similarly that potentiometers 321 and 324 correspond in function to potentiometer 315.

The control potentiometer 275 constitutes the control potentiometer of each motor controlling unit. The connections of relay coils 254 and 256 of relay 250 have been traced. It will be recalled that these relay coils were connected between the control potentiometer contact arm 277 and the contact arm 294 of the follow-up potentiometer 290. Similarly, the relay coils 258 and 260 of relay 251 are connected between contact arm 296 of the follow-up potentiometer 291 and contact arm 277 of control potentiometer 275 as follows: from contact arm 296 through conductor 330, relay coil 258, conductor 331, relay coil 260, and conductors 332, 334, and 313 to contact arm 277. Similarly, relay coils 263 and 265 of relay 252 are connected between contact arm 298 of the follow-up potentiometer 293 and the contact arm 277 of control potentiometer 275 as follows: from contact arm 298 through conductor 336, relay coil 263, conductor 337, relay coil 265, and conductors 338, 334, and 313 to contact arm 377.

The energizations of the upper coils of each relay are thus controlled by the relative position of the control potentiometer contact arm 277 and the contact arm of the follow-up potentiometer associated with that relay.

*Operation of Figure 3 species*

The relays are all shown in their balanced position. In view of the fact that a shunting resistance has been omitted for purposes of simplicity, the relays are balanced when no current whatsover flows into the upper relay coils. Thus referring to the control system of relay 250, the contact arms 294 and 277 are in the same relative positions so that no potential difference exists between these contact arms and consequently there is no current flow through relay coils 254 and 256. Similarly, the positions of the contact arms 296 and 298 of follow-up potentiometers 291 and 293 also correspond to the position of contact arm 277 of the control potentiometer. If it is desired to change the position of all of the motors simultaneeously by an equal amount, the contact arm 277 of control potentiometer 275 is shifted. If, for example, the contact arm 277 is shifted to the right, each of the relays 250, 251 and 252 will be unbalanced in such a direction as to draw the armature and switch blade to the left in the same manner as described in connection with the previous species. Each of the motors will be placed into operation to cause a movement of the device positioned thereby and to also cause a movement of the contact arm of the associated rebalancing potentiometer to the right. Upon the contact arm of each rebalancing potentiometer assuming a position corresponding to the new position of the contact arm on the control potentiometer 275, the relay associated with that follow-up potentiometer will be balanced and will assume the midposition. Regardless of the relative speed of the individual motors, the motors will all eventually stop at the position corresponding to the position of the control potentiometer 277. If the control arm 277 is moved to the left, the motors will all move in the opposite direction by an amount corresponding to the movement of the contact arm 277.

It will thus be noted from the above that the control potentiometer 275 constitutes a means for moving a plurality of remotely located motors by an equal amount. It often happens, however, that in such a multiple motor control system it is desirable to at times control certain motors individually. The potentiometers 315, 321, and 324 provide such a means. As explained previously, these potentiometers control the voltage applied to their associated transformers 300, 320 and 323. The secondaries of these transformers are connected in series with the resistance element of the associated follow-up potentiometer. Since the secondaries are connected in opposition to each other, they do not affect the voltage drop across the follow-up potentiometer but merely shift the control point thereof. Thus referring specifically to the control system involving relay 250, the effect of an increase in the voltage applied to secondaries 302 and 303 is to shift the mid point of the potential drop between conductors 280 and 281 through resistor 294. This mid point is shifted in one direction or the other depending upon the phase of the voltage applied to primary 301 of the transformer 300. If the slider 317 is moved to the left, the voltage applied to primary 301 will be of such phase that the voltage introduced in the secondary winding 302 will oppose the voltage of secondary 271. The voltage introduced in secondary 303 will aid the voltage of the supply transformer. The result will be that the voltage drop between conductors 280 and 281 through resistance 295 will be displaced to the right. This will result in the energization of relay 250 being unbalanced in such a direction as to cause energization of the motor in a direction to drive contact arm 294 to the right. The motor controlled by relay 250 is thus controlled by potentiometer 315 independently of potentiometer 275. It will be understood that if contact 217 is moved in the opposite direction, the voltage introduced in secondaries 302 and 303 will be in the opposite direction so that the opposite action will take place. In other words, the electrical center will be shifted to the left and the motor will be driven in such a direction as to shift contact arm 294 to the left.

Inasmuch as the control systems for relays 251 and 252 are identical to that for relay 250, it will be apparent that potentiometers 321 and 324 are each capable of positioning their associated motor independently of the main control potentiometer.

It is to be noted that the arrangement of Figure 3 provides an arrangement whereby a series of motors may be controlled in unison by a single control potentiometer and wherein the motors may be individually controlled by individual control potentiometers without the introduction of any appreciable impedance into the control circuit. The only impedance which is present is the small impedance of the transformer secondaries which impedance is substantially constant regardless of the voltage applied to the primary of the transformer.

*Conclusion*

It will be noted that in each of the species of our invention, the action of the motor control system is compensated in accordance with one or more conditions by the introduction of voltages at appropriate points in the system and without appreciably changing the impedance of the system. While the systems have been specifically described in connection with cooling systems, they could be employed in connection with heating systems or in any other case in which a compensated motor control system of the follow-up type is desired. Where the systems are used in connection with heating, the valve 10 could control the flow of a heat producing fluid such as a fluid fuel or steam and the various controls would be arranged to operate in the manner necessary in heating. In general, while we have shown certain specific embodiments of our invention, this is for purposes of illustration only and our invention is limited only by the scope of the appended claims.

We claim as our invention:

1. In a motor control system, a motor, control means including a control circuit having a substantially constant impedance, a variable control impedance and a variable follow-up impedance positioned by said motor, said control means being operative upon a change in value of said control impedance to cause said motor to run until the position thereof corresponds to the new value of said control impedance, and means for shifting the range of movement of said motor with respect to any given range of values of said control impedance, said last named means comprising means independent of said motor for continuously introducing a variable voltage in said control circuit by induction into said constant impedance.

2. In a motor control system, a motor, a control circuit therefor comprising a variable controlling impedance and a variable follow-up impedance positioned by said motor, and means for changing the ultimate effect of said controlling impedance without materially changing the total impedance of said circuit, said means comprising a transformer having its secondary permanently connected in said control circuit and its primary connected to means independent of said motor for variably energizing said primary.

3. In a motor control system, a motor, a control circuit therefor comprising a variable controlling impedance and a variable follow-up impedance positioned by said motor, and means for changing the effect of said controlling impedance without materially changing the total impedance of said circuit, said means comprising a transformer having a primary and a pair of secondaries, said primary being connected to means for variably energizing the same and said secondaries being connected in phase opposition in one portion of said circuit.

4. In a motor control system, a motor, a control circuit therefor comprising a variable controlling impedance and a variable follow-up impedance positioned by said motor, means for changing the ultimate effect of said controlling impedance without materially changing the total impedance of said circuit, said means comprising a transformer having a primary and a secondary winding, said secondary winding being permanently connected in said control circuit, and means including a plurality of other controllers for variably energizing said primary winding in accordance with the relative positions of said other controllers.

5. In a motor control system, a motor, a control potentiometer, a follow-up potentiometer positioned by said motor, each of said potentiometers comprising a relatively movable contact and resistor, a motor controlling means, a source of power, means connecting the resistors of said potentiometers in parallel with each other to said source of power and said motor controlling means between said contacts to form a control circuit, said motor controlling means being responsive to the unbalance current of said circuit to cause said motor to be variably energized in a manner dependent upon said unbalance current so that the motor assumes a position dependent upon the controlling position of said control potentiometer, and means for shifting the range of movement of said motor with respect to any given range of positions of said control potentiometer without materially changing the impedance of said control circuit, said means comprising means independent of said motor for continuously introducing a variable voltage into the connections of said motor controlling means to said contacts.

6. In a motor control system, a motor, a control potentiometer, a follow-up potentiometer positioned by said motor, each of said potentiometers comprising a relatively movable contact and resistor, motor controlling means, a source of power, means connecting the resistors of said potentiometers in parallel with each other to said source of power and said motor controlling means between said contacts to form a control circuit, said motor controlling means being responsive to the unbalance current of said circuit to cause said motor to be variably energized in a manner dependent upon said unbalance current so that the motor assumes a position dependent upon the controlling position of said control potentiometer, and means for shifting the range of movement of said motor with respect to any given range of positions of said control potentiometer without materially changing the impedance of said control circuit, said means comprising means for introducing two opposing simultaneously variable voltages on the opposite sides of one of said potentiometer resistors in the connections of said resistor to said other potentiometer resistor and said source of power.

7. In a motor control system, a motor, a control potentiometer, a follow-up potentiometer positioned by said motor, each of said potentiometers comprising a relatively movable contact and resistor, motor controlling means, a source of power, means connecting the resistors of said potentiometers in parallel with each other to said source of power and said motor controlling means between said contacts to form a control circuit, said motor controlling means being responsive to the unbalance current of said circuit to cause said motor to be variably energized in a manner dependent upon said unbalance current so that the motor assumes a position dependent upon the controlling position of said control potentiometer, and means for shifting the range of movement of said motor with respect to any given range of positions of said control potentiometer without materially changing the impedance of said control circuit, said means comprising a transformer having a primary and two secondary windings, said primary winding being connected to means for variably energizing the same, and said secondaries being connected in opposition and on opposite sides of one of said potentiometer resistors in the connections of said resistor to said other potentiometer resistor and said source of power.

8. In a motor control system, a motor, a control potentiometer, a follow-up potentiometer positioned by said motor, each of said potentiometers comprising a relatively movable contact and resistor, motor controlling means, a source of power, means connecting the resistors of said potentiometers in parallel with each other to said source of power and said motor controlling means between said contacts to form a control circuit, said motor controlling means being responsive to the unbalance current to cause said motor to be variably energized in a manner dependent upon said unbalance current so that the motor assumes a position dependent upon the controlling position of said control potentiometer, and means for changing the ultimate extent of movement of said motor for a predetermined movement of said control potentiometer without materially changing the impedance of said control circuit, said means comprising means independent of said unbalance current for introducing a variable voltage into the connections of one of said potentiometer resistors to the other elements of the system.

9. In a motor control system, a motor, a control potentiometer, a follow-up potentiometer positioned by said motor, each of said potentiometers comprising a relatively movable contact and resistor, motor controlling means, a source of power, means connecting the resistors of said potentiometers in parallel with each other to said source of power and said motor controlling means between said contacts to form a control circuit, said motor controlling means being responsive to the unbalance current to cause said motor to be variably energized in a manner dependent upon said unbalance current so that the motor assumes a position dependent upon the controlling position of said control potentiometer, and means for changing the extent of movement of said motor for a predetermined movement of said control potentiometer without materially changing the impedance of said control circuit, said means comprising means for introducing a pair of variable voltages of the same phase on opposite sides of one of said potentiometer resistors into the connections of said resistor to the other elements of the system.

10. In a motor control system, a motor, a control potentiometer, a follow-up potentiometer positioned by said motor, each of said potentiometers comprising a relatively movable contact and resistor, motor controlling means, a source of power, means connecting the resistors of said potentiometers in parallel with each other to said source of power and said motor controlling means between said contacts to form a control circuit, said motor controlling means being responsive to the unbalance current to cause said motor to be variably energized in a manner dependent upon said unbalance current so that the motor assumes a position dependent upon the controlling position of said control potentiometer, and means for changing the extent of movement of said motor for a predetermined movement of said control potentiometer without materially changing the impedance of said control circuit, said means comprising a transformer having a primary winding and two secondary windings, said primary winding being connected to means for variably energizing the same, and said secondary windings being connected in the same phase relationship and on opposite sides of one of said potentiometer resistors in the connections of said resistor to the other elements of the system.

11. In a motor control system, a motor, a control potentiometer, a follow-up potentiometer positioned by said motor, each of said potentiometers comprising a relatively movable contact and resistor, motor controlling means, a source of power, means connecting the resistors of said potentiometers in parallel with each other to said source of power and said motor control means to said resistors through said contacts to form a control circuit, said motor controlling means being operative to position said motor in accordance with the relative controlling positions of said potentiometers so that said motor will normally assume a predetermined position dependent upon the controlling position of said control potentiometer, and means for shifting the range of movement of said motor with respect to any given range of positions of said control potentiometer without materially changing the impedance of said control circuit, said means comprising a transformer having a primary winding and two secondary windings, said secondary windings being connected in opposition and on opposite sides of one of said potentiometer resistors in the connections of said resistor to said other potentiometer resistor and said source of power, and means including a plurality of other controllers for variably energizing said primary winding in accordance with the relative positions of said other controllers.

12. In a motor control system, a motor, a control potentiometer, a follow-up potentiometer positioned by said motor, each of said potentiometers comprising a relatively movable contact and resistor, motor controlling means, a source of power, means connecting the resistors of said potentiometers in parallel with each other to said source of power and said motor control means to said resistors through said contacts to form a control circuit, said motor controlling means being operative to position said motor in accordance with the relative controlling positions of said potentiometers so that said motor will normally assume a predetermined position dependent upon the controlling position of said control potentiometer, and means for shifting the range of movement of said motor with respect to any given range of positions of said control potentiometer without materially changing the impedance of said control circuit, said means comprising a transformer having a primary winding and two secondary windings, said secondary windings being connected in opposition and on opposite sides of one of said potentiometer resistors in the connections of said resistor to said other potentiometer resistor and said source of power, means including a plurality of other impedances connected in the form of a Wheatstone bridge, and means for applying the unbalance voltage of said bridge to said primary winding.

13. In a motor control system, a plurality of motors, a main variable control impedance, a plurality of follow-up impedances each positioned by one of said motors, a motor controlling means associated with each motor and its associated follow-up impedance and with the main control impedance to cause said motor to assume a position dependent upon the position of said controlling impedance so that upon a change in the position of said controlling impedance, the positions of all of said motors are simultaneously changed correspondingly, and means associated with one of said motors for individually changing the position of that motor only without changing the impedance of the entire control circuit, said means comprising means for inducing a variable voltage in the energizing circuit of the associated motor controlling means.

14. In a motor control system, a plurality of motors, a main variable control impedance, a plurality of follow-up impedances each positioned by one of said motors, a motor controlling means associated with each motor and its associated follow-up impedance and with the main control impedance to cause said motor to assume a position dependent upon the position of said controlling impedance so that upon a change in the position of said controlling impedance, the positions of all of said motors are simultaneously changed correspondingly, and means associated with one of said motors for individually changing the position of that motor only without changing the impedance of the entire control circuit, said means comprising a transformer having its primary connected to means for variably energizing the same and its secondary in the energizing circuit of the associated motor controlling means.

15. In a motor control system, a motor, a control potentiometer, a follow-up potentiometer positioned by said motor, each of said potentiometers comprising a relatively movable contact and resistor, motor controlling means, and a control circuit including means connecting said motor control means between said contacts, and connections between each terminal of said control potentiometer and a corresponding terminal of said follow-up potentiometer, said connections including means for changing the potential of each said control potentiometer terminal with respect to its corresponding follow-up potentiometer terminal so as to change the ultimate effect of said control potentiometer on said motor, without substantially changing the impedance of said connections.

16. In a motor control system, a motor, a control potentiometer, a follow-up potentiometer positioned by said motor, each of said potentiometers comprising a relatively movable contact and resistor, motor controlling means, and a control circuit including means connecting said motor control means between said contacts, and connections between each terminal of said control potentiometer and a corresponding terminal of said follow-up potentiometer, each said connection including means for changing the potential of the control potentiometer terminal connected thereto with respect to its corresponding follow-up potentiometer terminal without substantially changing the impedance of said connection, and means for operating said potential changing means simultaneously and in an opposite sense, thereby shifting the range of operation of said control potentiometer contact with respect to the range of operation of said follow-up potentiometer contact.

17. In a motor control system, a motor, a control circuit therefor comprising a variable controlling impedance and a variable follow-up impedance positioned by said motor, means for changing the ultimate effect of said controlling impedance without materially changing the total impedance of said circuit, said means comprising a transformer having a primary and a secondary winding, said secondary winding being connected in said control circuit, means including a plurality of other controllers for variably energizing said primary winding in accordance with the relative positions of said other controllers, and means for adjusting the relative effects of said other controllers on the energization of said primary winding.

18. In a motor control system, a motor, a control circuit including a relay controlling the energization of said motor, a variable control impedance and a variable follow-up impedance positioned by said motor, said two impedances jointly controlling the energization of said relay to cause the motor to assume a position dependent upon the value of said variable control impedance, and means for changing the ultimate effect of said controlling impedance without materially changing the impedance of said circuit, said means comprising means independent of said motor and said relay for introducing a variable voltage in said circuit between said follow-up potentiometer and said relay.

19. In a motor control system, a motor, a control potentiometer, a follow-up potentiometer positioned by said motor, each of said potentiometers comprising a relatively movable contact and resistor, a motor controlling means, a source of power, means connecting the resistors of said potentiometers in parallel with each other to said source of power and said motor controlling means between said contacts to form a control circuit, said motor controlling means being responsive to the unbalance current of said circuit to cause said motor to be variably energized in a manner dependent upon said unbalance current so that the motor assumes a position dependent upon the controlling position of said control potentiometer, and means for shifting the range of movement of said motor with respect to any given range of positions of said control potentiometer, said means comprising means independent of said motor for continuously introducing a variable voltage into the connections of said motor controlling means to said contacts.

20. In a motor control system, a motor, a control potentiometer, a follow-up potentiometer positioned by said motor, each of said potentiometers comprising a relatively movable contact and resistor, a motor controlling means, a source of power, means connecting the resistors of said potentiometers with said source to form a normally balanced electrical network, an impedance device, means connecting said impedance device and said motor controlling means between said contacts to form a control circuit, said motor controlling means being responsive to the unbalance current of said network flowing in said circuit to cause said motor to be variably energized in a manner dependent upon said unbalance current so that the motor assumes a position dependent upon the controlling position of said control potentiometer, and means for changing the flow of current in said circuit to shift the range of movement of said motor with respect to any given range of positions of said control potentiometer, said means comprising a compensating potentiometer including a relatively movable contact and resistor, said resistor having terminals and a tap at a substantially central point thereon, a source of electrical energy connected to said terminals, means for moving said contact relative to said resistor, and connections between said contact, said tap, and said impedance device.

21. In a motor control system, a motor, a control potentiometer, a follow-up potentiometer positioned by said motor, each of said potentiometers comprising a relatively movable contact and resistor, a motor controlling means, a source of power, means connecting the resistors of said potentiometers with said source to form a normally balanced electrical network, an impedance device, means connecting said impedance device and said motor controlling means between said contacts to form a control circuit, said motor controlling means being responsive to the unbalance current of said network flowing in said circuit to cause said motor to be variably energized in a manner dependent upon said unbalance current so that the motor assumes a position dependent upon the controlling position of said control potentiometer, and means including a potentiometer and a device responsive to a physical condition for adjusting said potentiometer, said last named means normally shunting at least a portion of said impedance device but responsive to a variation in the value of said condition from a predetermined value to apply a potential across said impedance device whose value is substantially proportional to the deviation of said condition from said predetermined value.

22. In a motor control system, a motor, power supply means including a first transformer secondary winding, controlling means for said motor including a control circuit comprising a variable controlling impedance and said winding, a substantially constant impedance having at least a portion thereof connected in said circuit, said controlling means being effective to cause said motor to operate in a manner dependent upon the voltage across a portion of said control circuit including both said variable controlling impedance and at least said portion of said constant impedance, a second transformer secondary winding, and means normally effectively shunting said constant impedance but responsive to a condition indicative of a need for a change in the ultimate controlling effect of said variable impedance to apply a potential derived from said second winding across said constant impedance.

23. In a motor control system, a motor, controlling means for said motor including a control circuit comprising a variable controlling impedance, a substantially constant impedance having at least a portion thereof connected in said circuit, said controlling means being effective to cause said motor to operate in a manner dependent upon the voltage across a portion of said control circuit including both said variable controlling impedance and at least said portion of said constant impedance, and means for changing the ultimate controlling effect of said variable impedance, said means comprising a compensating potentiometer including a relatively movable contact and resistor, said resistor having terminals and a tap at a substantially central point thereon, a source of electrical energy connected to said terminals, means for moving said contact relative to said resistor, and means including electrical connections for introducing into said constant impedance a potential proportional to that existing between said tap and said contact.

24. In a motor control system, a motor, control means including a control circuit having a variable control potentiometer and a variable follow-up potentiometer positioned by said motor, said control means being operative upon a variation of said control potentiometer position to cause said motor to run until the position of the follow-up potentiometer corresponds to the new position of said control potentiometer, means having a substantially constant impedance for introducing into said control circuit a first variable voltage so as to change the ratio between a given movement of said control potentiometer and the responsive movement of said follow-up potentiometer without affecting the impedance of said circuit, and means also having a substantially constant impedance for introducing into said circuit a second variable voltage so as to shift the range of movement of said motor with respect to any given range of positions of said control potentiometer without affecting the impedance of said circuit.

25. In a motor control system, a motor, a control potentiometer, a follow-up potentiometer positioned by said motor, each of said potentiometers comprising a relatively movable contact and resistor, motor controlling means, and a control circuit including means connecting said motor control means between said contacts, and connections between each terminal of said control potentiometer and a corresponding terminal of said follow-up potentiometer, means having a substantially constant impedance for introducing into said control circuit a first variable voltage so as to change the ratio between a given movement of said control potentiometer and the responsive movement of said follow-up potentiometer without affecting the impedance of said circuit, and means also having a substantially constant impedance for introducing into said circuit a second variable voltage so as to shift the range of movement of said motor with respect to any given range of positions of said control potentiometer without affecting the impedance of said circuit, said last-named means comprising a transformer secondary winding in said connecting means.

26. In a motor control system, a motor, a control potentiometer, a follow-up potentiometer positioned by said motor, each of said potentiometers comprising a relatively movable contact and resistor, motor controlling means, and a control circuit including means connecting said motor control means between said contacts, and connections between each terminal of said control potentiometer and a corresponding terminal of said follow-up potentiometer, means having a substantially constant impedance for introducing into said control circuit a first variable voltage so as to change the ratio between a given movement of said control potentiometer and the responsive movement of said follow-up potentiometer without affecting the impedance of said circuit, and means also having a substantially constant impedance for introducing into said circuit a second variable voltage so as to shift the range of movement of said motor with respect to any given range of positions of said control potentiometer without affecting the impedance of said circuit, said last-named means comprising a pair of transformer secondary windings connected in phase opposition on opposite sides of one of said potentiometer resistors in said connections.

27. In a motor control system, a motor, controlling means for said motor including a control circuit comprising a variable controlling impedance, a substantially constant impedance permanently connected in said circuit, said controlling means being effective to cause said motor to operate in a manner dependent upon the voltage across a portion of said control circuit including both said variable controlling impedance and said constant impedance, means external to said circuit for continuously inducing a potential in said constant impedance to determine the ultimate controlling effect of said variable impedance, and means for varying said potential.

28. In a rebalancing motor control system, a motor, a normally balanced control circuit therefor comprising a substantially constant impedance, a variable controlling impedance, and a follow-up impedance variable in value by operation of said motor, means responsive to unbalance of said circuit for causing operation of said motor so as to rebalance said circuit by variation of said follow-up impedance, the rebalancing value of said follow-up impedance having a predetermined functional relationship to the value of said controlling impedance, and means external to said circuit and consisting of a further variable impedance variable by a device responsive to a physical condition for inducing a potential in said constant impedance to change said functional relationship to an extent dependent upon the value of said condition.

ROBERT J. KUTZLER.
LE ROY A. GRIFFITH.